United States Patent
Umemoto

(10) Patent No.: US 11,046,834 B2
(45) Date of Patent: Jun. 29, 2021

(54) SURFACE-MODIFIED NANODIAMOND, SURFACE-MODIFIED NANODIAMOND DISPERSION LIQUID, AND RESIN DISPERSION

(71) Applicant: DAICEL CORPORATION, Osaka (JP)

(72) Inventor: Kouichi Umemoto, Himeji (JP)

(73) Assignee: DAICEL CORPORATION, Osaka (JP)

(*) Notice: Subject to any disclaimer, the term of this patent is extended or adjusted under 35 U.S.C. 154(b) by 0 days.

(21) Appl. No.: 16/494,624

(22) PCT Filed: Apr. 3, 2018

(86) PCT No.: PCT/JP2018/014226
§ 371 (c)(1),
(2) Date: Sep. 16, 2019

(87) PCT Pub. No.: WO2018/186382
PCT Pub. Date: Oct. 11, 2018

(65) Prior Publication Data
US 2020/0017661 A1  Jan. 16, 2020

(30) Foreign Application Priority Data
Apr. 7, 2017 (JP) .............................. JP2017-077134

(51) Int. Cl.
C08K 9/06 (2006.01)
C01B 32/28 (2017.01)
B82Y 30/00 (2011.01)
B82Y 40/00 (2011.01)
C08K 3/04 (2006.01)

(52) U.S. Cl.
CPC ............. *C08K 9/06* (2013.01); *B82Y 30/00* (2013.01); *B82Y 40/00* (2013.01); *C01B 32/28* (2017.08); *C08K 3/04* (2013.01)

(58) Field of Classification Search
CPC .. C08K 9/06; C08K 3/04; C01B 32/28; B82Y 40/00; B82Y 30/00
USPC ...................................................... 524/188
See application file for complete search history.

(56) References Cited

U.S. PATENT DOCUMENTS

2007/0107317 A1* 5/2007 Takahagi ............ H01L 21/3146
                                                                  51/307
2009/0283013 A1  11/2009 Takahagi et al.
2010/0233371 A1*  9/2010 Kim ........................ F02F 3/10
                                                                  427/290

FOREIGN PATENT DOCUMENTS

| CN | 1380363 A | | 11/2002 |
|---|---|---|---|
| CN | 102528648 A | * | 7/2012 |
| CN | 104810784 A | | 5/2015 |
| EP | 3345972 A1 | | 7/2018 |
| JP | 2005-1983 A | | 1/2005 |
| JP | 2010-126669 A | | 6/2010 |
| JP | 2012-17225 A | | 1/2012 |
| JP | 2012-25930 A | | 2/2012 |
| JP | 2012-161965 A | | 8/2012 |
| JP | 2015-219125 | * | 12/2015 |
| JP | 2015-219125 A | | 12/2015 |
| WO | WO 2005/038897 A1 | | 4/2005 |
| WO | WO 2009/060613 A1 | | 5/2009 |
| WO | WO 2014/174150 A1 | | 10/2014 |
| WO | WO 2015/092142 A1 | | 6/2015 |
| WO | WO 2017/038333 A1 | | 3/2017 |

OTHER PUBLICATIONS

An et al., Chinese Journal of Reactive Polymers, 11(2), 152-156, 2002. (Year: 2002).*
Tsubota et al., Journal of the Ceramic Society of Japan, 110(10), 904-910, 2002. (Year: 2002).*
Extended European Search Report, dated Dec. 11, 2020, for European Application No. 18780590.8.
An et al., "Surface Functionalized Nanodiamonds," Chinese Journal of Reactive Polymers, vol. 11, No. 2, 2002 (Dec. 20, 2002), pp. 152-156.
English translation of the International Search Report, dated Jul. 3, 2018, for International Application No. PCT/JP2018/014226.
International Preliminary Report on Patentability and English translation of the Written Opinion of the International Searching Authority, dated Oct. 17, 2019, for International Application No. PCT/JP2018/014226.
Krueger et al., "Biotinylated Nanodiamond: Simple and Efficient Functionalization of Detonation Diamond," Langmuir, vol. 24, 2008 (Published on Web Mar. 1, 2008), pp. 4200-4204.

* cited by examiner

*Primary Examiner* — Hui H Chin
(74) *Attorney, Agent, or Firm* — Birch, Stewart, Kolasch & Birch, LLP

(57) ABSTRACT

To provide a surface-modified nanodiamond including an N-substituted or unsubstituted amino group having excellent reactivity with other compounds; and having excellent dispersibility in dispersion media and resins. The surface-modified nanodiamond according to the present invention is a surface-modified nanodiamond including a surface-modifying group on a surface of a nanodiamond particle, wherein the surface-modifying group includes a group represented by Formula (1) below, wherein reference signs in Formula (1) below are as described in the present specification.

21 Claims, 2 Drawing Sheets

SURFACE-MODIFIED NANODIAMOND, SURFACE-MODIFIED NANODIAMOND DISPERSION LIQUID, AND RESIN DISPERSION

TECHNICAL FIELD

The present invention relates to a surface-modified nanodiamond, a surface-modified nanodiamond dispersion liquid including the surface-modified nanodiamond and a dispersion medium, and a resin dispersion including the surface-modified nanodiamond and a resin. The present application claims priority to JP 2017-077134 filed to Japan on Apr. 7, 2017, the content of which is incorporated herein.

BACKGROUND ART

Nanodiamonds are ultrafine particles having a very large specific surface area and have high mechanical strength and electrical insulation, and excellent thermal conductivity. Nanodiamonds also have deodorant effect, antimicrobial effect, and chemical resistance. Thus, nanodiamonds are used in abrasive materials, conductivity imparting materials, insulating materials, deodorants, antimicrobial agents, and the like.

Nanodiamond particles having such characteristics are generally synthesized by detonation method. Nanodiamond particles obtained by detonation method often form aggregates. The aggregates are subjected to a crushing treatment using a mill, such as a bead mill, thereby providing what is called "a single-digit nanodiamond particle" having a particle size D50 (median size) of less than 10 nm (Patent Documents 1 and 2 below).

On the other hand, while taking advantage of the characteristics of the nanodiamond, to expand the use thereof to various applications, such as heat dissipation materials, optical materials (for example, highly functional film materials), material reinforcements, heat exchange fluid media, coating materials (for example, antimicrobial coating materials and deodorant coating materials), abrasives, lubricants, and medical materials, a surface-modifying group is introduced to nanodiamond particles depending on purpose.

As a method for imparting a surface-modifying group to nanodiamond particles, a process is known which involves subjecting the nanodiamond particles to silicidation treatment (silylation treatment) via a reaction with a silane coupling agent, to obtain nanodiamond particles having a silanol group in a surface-modifying group (Patent Document 2 below).

CITATION LIST

Patent Document

Patent Document 1: JP 2005-001983 A
Patent Document 2: JP 2012-17225 A

SUMMARY OF INVENTION

Technical Problem

According to Patent Document 2 above, the nanodiamond particles are reacted with trimethylchlorosilane for silicidation treatment (silylation treatment), and thus aggregates of nanodiamond particles (average particle size of hundreds nm or greater) are obtained. However, Patent Document 2 makes no reference to obtaining of nanodiamond particles having a particle size of 50 nm or less and no reference to introduction of an amino group as a surface-modifying group.

Accordingly, an object of the present invention is to provide a surface-modified nanodiamond having: an N-substituted or unsubstituted amino group having excellent reactivity with other compounds; and having excellent dispersibility in dispersion media and resins.

Another object of the present invention is to provide a nanodiamond dispersion liquid in which the surface-modified nanodiamond is highly dispersed in a dispersion medium, such as an organic solvent.

Still another object of the present invention is to provide a resin dispersion in which the surface-modified nanodiamond is highly dispersed in the resin.

Solution to Problem

As a result of diligent research to solve the above problems, the present inventor found that a reaction of nanodiamond particles with a silane coupling agent having an N-substituted or unsubstituted amino group under milling and dissociation treatment allows to obtain a surface-modified nanodiamond having high dispersibility in dispersion media and resins, and having an N-substituted or unsubstituted amino group having excellent reactivity with other compounds at the end of a surface-modifying group that is not bonded to a nanodiamond particle. The present invention has been completed based on these findings.

That is, according to an embodiment of the present invention, a surface-modified nanodiamond including a surface-modifying group on a surface of a nanodiamond particle is provided, wherein the surface-modifying group includes a group represented by Formula (1) below:

[Chem. 1]

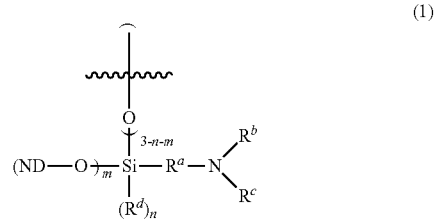

where $R^a$ represents an alkylene group having from 1 to 12 carbons, $R^b$ and $R^c$ each represent a hydrogen atom, an alkyl group having from 1 to 3 carbons, an aryl group, or an aralkyl group, and $R^d$ represents an identical or different alkyl group having from 1 to 3 carbons; a bond of an oxygen atom bonded to an atomic bond indicated by a wavy line in Formula (1) is identical or different and bonds to a hydrogen atom, an alkyl group having from 1 to 3 carbons, an acyl group, or a silicon atom in another group represented by Formula (1); n is 0, 1, or 2; m is 1, 2, or 3; and m+n<3; and an atomic bond of the oxygen atom at the left end in Formula (1) bonds to a nanodiamond particle.

In an embodiment of the present invention, the nanodiamond particle is preferably a detonation nanodiamond particle.

Also, according to an embodiment of the present invention, a surface-modified nanodiamond dispersion liquid including the surface-modified nanodiamond and a dispersion medium is provided.

In an embodiment of the present invention, a median size of the surface-modified nanodiamond is preferably 50 nm or less.

In an embodiment of the present invention, the surface-modified nanodiamond dispersion liquid includes zirconium, and a ratio of the zirconium (in terms of Zr element)

is 0.01 wt. % or greater based on a total content of the surface-modified nanodiamond and the zirconium (in terms of Zr element) in the surface-modified nanodiamond dispersion liquid.

Also, according to an embodiment of the present invention, a resin dispersion including the surface-modified nanodiamond and a resin is provided.

In an embodiment of the present invention, the resin dispersion includes zirconium, and a ratio of the zirconium (in terms of Zr element) is 0.01 wt. % or greater based on a total content of the surface-modified nanodiamond and the zirconium (in terms of Zr element) in the resin dispersion.

Advantageous Effects of Invention

The surface-modified nanodiamond according to an embodiment of the present invention has an N-substituted or unsubstituted amino group, serving as a reaction site, in a surface-modifying group, and thus has excellent reactivity with other compounds, such as acid, ester, epoxy, ketone, and halogen compounds. In addition, the surface-modified nanodiamond according to an embodiment of the present invention has excellent dispersibility in dispersion media, such as organic solvents, and resins.

The surface-modified nanodiamond dispersion liquid according to an embodiment of the present invention is particularly excellent in nanodiamond particle dispersibility and can be suitably used as a feedstock for a surface-modified nanodiamond.

In the resin dispersion according to an embodiment of the present invention, the resin and the surface-modified nanodiamond exhibit good dispersibility and affinity, and in a case of a transparent resin, high mechanical strength, high refractive index, and high thermal conductivity of the nanodiamond can be imparted while maintaining transparency.

DESCRIPTION OF EMBODIMENTS

Surface-Modified Nanodiamond

A surface-modified nanodiamond according to an embodiment of the present invention (hereinafter, nanodiamond may be referred to as "ND") is a surface-modified nanodiamond including a surface-modifying group on a surface of a nanodiamond particle, wherein the surface-modifying group includes a group represented by Formula (1) below. Here, the surface-modified ND according to an embodiment of the present invention may have a group besides those represented by Formula (1) below as a surface-modifying group.

[Chem. 1]

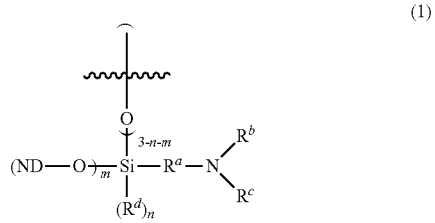

(1)

In Formula (1), $R^a$ represents an alkylene group having from 1 to 12 carbons, $R^b$ and $R^c$ each represent a hydrogen atom, an alkyl group having from 1 to 3 carbons, an aryl group, or an aralkyl group, and $R^d$ represents an identical or different alkyl group having from 1 to 3 carbons; a bond of an oxygen atom bonded to an atomic bond indicated by a wavy line in Formula (1) is identical or different and bonds to a hydrogen atom, an alkyl group having from 1 to 3 carbons, an acyl group, or a silicon atom in another group represented by Formula (1); n is 0, 1, or 2; m is 1, 2, or 3; and m+n≤3; and ND in Formula (1) represents the nanodiamond particle.

Figure 1:
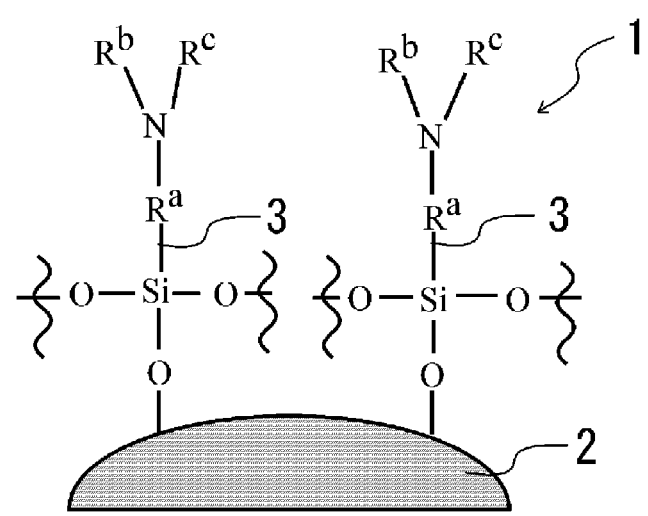
FIG. 1 is an enlarged schematic view illustrating an example of the surface-modified nanodiamond according to an embodiment of the present invention.

FIG. 1 is an enlarged schematic view illustrating an example of a surface-modified ND according to an embodiment of the present invention, wherein the surface-modified ND [1] includes a surface-modifying group [3] on a surface of an ND particle [2]. FIG. 1 illustrates an instance where n is 0 and m is 1 in the group represented by Formula (1) in the surface-modifying group [3]. Here, $R^a$, $R^b$, and $R^c$ in FIG. 1 are the same as $R^a$, $R^b$, and $R^c$ in Formula (1). The atomic bond of the oxygen atom bonded to the bond with the wavy line in FIG. 1 is also the same as in Formula (1).

The alkyl group having from 1 to 3 carbons for $R^b$, $R^c$, and $R^d$ in Formula (1) is preferably an ethyl group or a methyl group and more preferably a methyl group. The aryl group for $R^b$ and $R^c$ in Formula (1) is preferably a phenyl group or a tolyl group and more preferably a phenyl group. The aralkyl group for $R^b$ and $R^c$ in Formula (1) is preferably a benzyl group.

The alkyl group having from 1 to 3 carbons for the bond of the oxygen atom bonded to the atomic bond indicated by the wavy line in Formula (1) is preferably an ethyl group or a methyl group and more preferably a methyl group. The acyl group for the bond of the oxygen atom bonded to the atomic bond indicated by the wavy line in Formula (1) is preferably an acetyl group. Here, when m in Formula (1) is 2, it means that the group represented by Formula (1) is bonded to the nanodiamond particle at two locations. When m in Formula (1) is 3, it means that the group represented by Formula (1) is bonded to the nanodiamond particle at three locations, and in this case, n is 0.

The surface-modified ND according to an embodiment of the present invention is obtained by reacting ND particles with the silane coupling agent including a hydrocarbon group including an N-substituted or unsubstituted amino group (condensation reaction). The silane coupling agent has at least one (preferably three) hydrolyzable group. Examples of the hydrolyzable group include alkoxy groups, such as methoxy groups, ethoxy groups, and propoxy groups. The surface-modified ND according to an embodiment of the present invention is a reaction product (condensation reaction product) of ND particles with the silane coupling agent. The group represented by Formula (1) is a surface-modifying group derived from the silane coupling agent used in the above reaction.

In addition to the above reaction of ND particles with the silane coupling agent, a hydrolysis reaction of the hydrolyzable groups contained in the silane coupling agent and a hydrolysis/condensation reaction between the hydrolyzable groups of a plurality of the silane coupling agents can occur before or after the reaction with the ND particles. The hydrogen atom for the bond of the oxygen atom bonded to the atomic bond indicated by the wavy bond in Formula (1) indicates a state where the hydrolyzable group bonded to the silicon atom in the silane coupling agent is hydrolyzed into a hydroxyl group. In addition, the silicon atom in another group represented by Formula (1) for the bond of the oxygen atom with the wavy line in Formula (1) indicates a state where —Si—O—Si— bonds are formed between multiple groups represented by Formula (1) as a result of condensation reactions occurring between hydroxyl groups of multiple groups represented by Formula (1), resulting from hydrolysis of the hydrolyzable groups bonded to silicon atoms in the silane coupling agent as described above.

Examples of the silane coupling agent include 3-aminopropyltrimethoxysilane, 3-aminopropyltriethoxysilane, [3-(N,N-dimethylamino)propyl]trimethoxysilane, [3-(phenylamino)propyl]trimethoxysilane, 4-aminobutyltrimethoxysilane, 5-aminopentyltrimethoxysilane, 6-aminohexyltrimethoxysilane, 8-aminooctyltrimethoxysilane, and 10-aminodecyltrimethoxysilane. Details of the reaction of the ND particles with the silane coupling agent will be mentioned in modification S4 in a method for producing the surface-modified nanodiamond described later.

The ND particles constituting the surface-modified ND may contain at least primary particles of the nanodiamond, and may additionally contain secondary particles formed by aggregation of approximately a few to several tens of the primary particles.

For example, a detonation ND (i.e., an ND generated by detonation method) or a high temperature-high pressure ND (i.e., an ND generated by high temperature-high pressure method) can be used as the ND particles. A detonation ND is preferably used in the surface-modified ND according to an embodiment of the present invention, in terms of better dispersibility, namely, a particle size of the primary particle on single-digit nanometer scale.

The detonation method includes air-cooling detonation method and water-cooling detonation method. In an embodiment of the present invention, among them, air-cooling detonation method is preferred in that it can provide an ND having smaller primary particles than those by water-cooling detonation method. In addition, detonation may be performed in atmospheric air and may be performed in an inert gas atmosphere, such as a nitrogen atmosphere, an argon atmosphere, and a carbon dioxide atmosphere. Accordingly, the ND for the modification S4 is preferably a detonation ND and more preferably an air-cooling detonation ND (i.e., an ND generated by air-cooling detonation method). In addition, the ND particles are more preferably ND particles that are generated by air-cooling detonation method in an inert gas atmosphere in terms of efficient generation of ND particles having a small average particle size and a large amount of functional groups on the surface of the primary particle. Here, examples of the surface functional group of the ND particles include an amino group, a hydroxyl group, and a carboxyl group. Details on the production, purification and the like of the detonation ND will be mentioned in a method for producing the surface-modified nanodiamond described later.

The surface-modified ND has a surface-modifying group, thus prevents aggregation of ND particles, due to steric hindrance of the surface-modifying group, as compared to ND particles having no surface-modifying group, and can exhibit excellent dispersibility. In addition, the hydrocarbon group contained in the surface-modifying group is hydrophobic and thus exhibits affinity with resins and the like, and therefore the surface-modified ND can exhibit good wettability and compatibility with resins and the like.

Method for Producing Surface-Modified Nanodiamond

The surface-modified ND according to an embodiment of the present invention can be produced, for example, by generating ND particles through detonation method (more preferably air-cooling detonation method and particularly preferably air-cooling detonation method in an inert gas atmosphere), and reacting the resulting ND particles with the silane coupling agent to apply surface modification to the ND particles.

Figure 2:
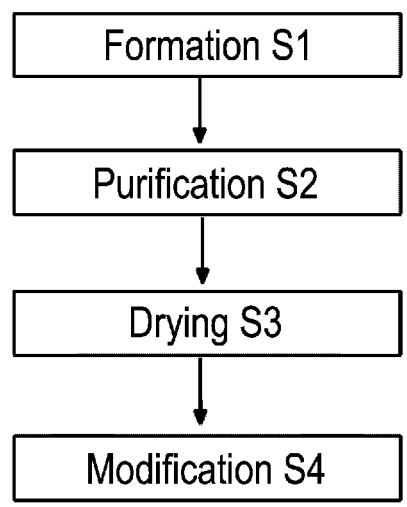
FIG. 2 is an example of a flow diagram of a method for producing the surface-modified nanodiamond according to an embodiment of the present invention.

A method for producing the surface-modified ND according to an embodiment of the present invention is exemplified below according to FIG. 2 (formation S1, purification S2, drying S3, and modification S4), but for the surface-modified ND according to an embodiment of the present invention, it may further include another process than the above (for example, oxidization with oxygen and hydrogenation), and is not limited to the production method described below.

Formation S1

In the formation S1, an ND is formed by air-cooling detonation method in an inert gas atmosphere. First, a molded explosive fitted with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume thereof is, for example, from 0.5 to 40 m. A mixture of trinitrotoluene (TNT) and cyclotrimethylenetrinitroamine, i.e., hexogen (RDX), can be used as the explosive. The weight ratio of TNT and RDX (TNT/RDX) ranges from 40/60 to 60/40, for example.

In the formation S1, the electric detonator is then triggered to detonate the explosive in the vessel. "Detonation" refers to, among explosive reactions associated with chemical reactions, one that includes a flame surface where the reaction occurs traveling at a high speed exceeding the speed of sound. During the detonation, the explosive that is used undergoes partially incomplete combustion and releases carbon, the carbon thereof is used as a raw material, and ND is produced by the action of the pressure and energy of the shock waves that are produced in the explosion. The formed ND is subjected to Coulomb interaction between crystal planes, in addition to Van der Waals forces between adjacent primary particles or crystallites, and as a result, the product very strongly aggregates to form aggregates.

In the formation S1, the vessel and its interior are left stand for about 24 hours at room temperature, thereby allowed to cool. After the cooling, an ND crude product (including ND aggregates and soot generated as described above) adhering to the inner wall of the vessel is scraped with a spatula to collect the ND crude product. According to the method as described above, a crude product of ND particles can be obtained. The air-cooling detonation method in an inert gas atmosphere is suitable for forming an ND having a small average particle size and a large amount of functional groups on the surface of the primary particle. It is thought that because the growth of diamond nuclei from the raw material carbon is inhibited during the formation of the diamond crystallites, a portion of the raw material carbon forms (some together with oxygen or the like) surface functional groups. In addition, a desired amount of ND crude product can be obtained by performing the formation S1 as described above a required number of times.

Purification S2

The purification S2 includes an acid treatment that allows a strong acid to act on the raw material ND crude product, for example, in an aqueous solvent. The ND crude product obtained by detonation method is susceptible to including a metal oxide. The metal oxide is an oxide, such as those of Fe, Co. and Ni, originating from the vessel or the like used in detonation method, and the metal oxide can be dissolved and removed from the ND crude product, for example, by the action of a predetermined strong acid in a water solvent. The strong acid used in the acid treatment is preferably a mineral acid, and examples thereof include hydrochloric acid, hydrofluoric acid, sulfuric acid, nitric acid, and a mixture thereof (=a mixed acid). In the acid treatment, one type of strong acid may be used alone, or two or more types of strong acids may be used. The concentration of the strong acid used in the acid treatment is, for example, from 1 to 50 wt. %. The acid treatment temperature is, for example, from 70 to 150° C. The duration of the acid treatment is, for example, from 0.1 to 24 hours. Furthermore, the acid treatment can be performed under reduced pressure, under normal pressure, or under increased pressure. After such acid treatment, solid (including the ND aggregates) is washed with water, for example, by decantation. Washing of the solid content by decantation is preferably repeated until the pH of the precipitate solution reaches 2 to 3, for example. If the content of the metal oxide in the ND crude product obtained by detonation method is small, the acid treatment as described above may be omitted.

The purification S2 includes an oxidation treatment to remove graphite from the ND crude product (ND aggregates before the completion of purification) using an oxidizing agent. The ND crude product obtained by detonation method includes graphite (black lead), which is derived from carbon that did not form ND crystals from amongst the carbon that was released when the explosive that was used underwent partially incomplete combustion. For example, the graphite can be removed from the ND crude product by, for example, an oxidation treatment in which a predetermined oxidizing agent is allowed to act thereon in an aqueous solvent after the acid treatment described above. Examples of the oxidizing agent used in the oxidation treatment include chromic acid, chromic anhydride, dichromic acid, permanganic acid, perchloric acid, and salts thereof. In the oxidation treatment, one type of oxidizing agent may be used alone, or two or more types of oxidizing agents may be used. The concentration of the oxidizing agent used in the oxidation treatment is, for example, from 3 to 50 wt. %. The amount of the oxidizing agent used in the oxidation treatment is, for example, from 300 to 500 parts by weight per 100 parts by weight of the ND crude product subjected to the oxidation treatment. The oxidation treatment temperature is, for example, from 100 to 200° C. The duration of oxidation treatment is, for example, from 1 to 24 hours. The oxidation treatment can be performed under reduced pressure, under normal pressure, or under increased pressure. In addition, the oxidation treatment is preferably performed in the presence of a mineral acid in terms of improving the removal efficiency of the graphite. Examples of the mineral acid include hydrochloric acid, hydrofluoric acid, sulfuric acid, nitric acid, and aqua regia. In the case where a mineral acid is used in the oxidation treatment, the concentration thereof is, for example, from 5 to 80 wt. %. After such oxidation treatment, solid (including the ND aggregates) is washed with water, for example, by decantation or centrifugal sedimentation method. The supernatant liquid is colored when initially washed with water, but the solid is preferably repeatedly washed with water until the supernatant becomes visually transparent. The repeated washing with water reduces or eliminates impurity electrolytes (NaCl and the like). Low electrolyte concentration is suitable for achieving high dispersibility and high dispersion stability of the ND particles obtained by the present method.

After such oxidation treatment, the ND may be treated with an alkaline solution. The alkaline treatment enables conversion of an acidic functional group (for example, a carboxyl group) on the surface of the ND into a salt (for example, a carboxylate salt). Examples of the alkaline solution used include an aqueous sodium hydroxide solution. In the alkaline treatment, the alkaline solution concentration is, for example, from 1 to 50 wt. %, the treatment temperature is, for example, from 70 to 150° C., and the duration of the treatment is, for example, from 0.1 to 24 hours. In addition, after such alkaline treatment, the ND may be treated with an acid solution. Through the acid treatment, the salt of the acidic functional group on the ND surface can be converted back to the free acidic functional group again. Examples of the acid solution used include hydrochloric acid and the like. The acid treatment may be performed at room temperature or may be performed under heating. Solid of the ND (including the ND aggregates) that has undergone the alkaline treatment after the oxidation treatment and the subsequent acid treatment is washed with water, for example, by decantation or centrifugal sedimentation method.

Subsequently, the present method can include oxidization with oxygen. The oxidization with oxygen is a process to oxidize the surface of the ND obtained through the purification to form an oxygen-containing group. The oxidization with oxygen is preferably performed in an oxygen atmosphere or in an oxygen atmosphere diluted with nitrogen (for example, heat treatment at a temperature from 300 to 400° C. for approximately 1 to 5 hours).

Subsequently, the present method can include hydrogenation. The hydrogenation is a process to generate an ND having a hydroxyl group as a surface functional group by subjecting the ND having the oxygen-containing group obtained through the oxidization with oxygen to heat treatment (for example, heating treatment at a temperature from 500 to 700° C. for approximately 1 to 10 hours) in a hydrogen atmosphere or in a hydrogen atmosphere diluted with nitrogen.

Drying S3

In the present method, the drying S3 is then performed. In the drying, for example, the liquid is evaporated from a solution obtained through the purification S2 using an evaporator, and then the resulting residual solid is dried by heating and drying in a drying oven. The heating temperature for drying is, for example, from 40 to 150° C. Through such drying S3, ND aggregates (aggregates of ND particles) are obtained as a powder.

Modification S4

In the present method, the modification S4 is then performed. The modification S4 is a process to apply surface modification to the ND particles by the action of the silane coupling agent on the ND aggregates (aggregates of ND particles) that have undergone the drying S3. In the modification S4, the reaction (silylation reaction) of the ND particles with the silane coupling agent is performed while crushing and dissociating using a crushing medium.

In the modification S4, first, the powder of the ND aggregates that have undergone the drying S3, the silane coupling agent, and a solvent are charged into a reaction vessel to prepare a mixed solution, and the mixed solution is stirred. Then, a crushing medium, such as zirconia beads, is added to the mixed solution in the reaction vessel, and the reaction (silylation reaction) of the ND particles with the silane coupling agent is allowed to proceed under stirring the mixed solution using an ultrasonic generator or the like to homogenize the solution. This reaction is preferably performed under cooling with ice water or the like to mitigate heat generated. By performing the reaction with addition of zirconia beads or the like and generation of an ultrasonic wave, the ND aggregates are efficiently crushed and dissociated, and the silane coupling agent can exert its action. Specifically, cavitation is generated in the solution subjected to ultrasonic irradiation based on an acoustic effect, and jet flow occurs upon the collapse of the cavitation (microbubbles), thereby the zirconia beads in the solution can obtain very large kinetic energy. The zirconia beads provide impact energy to the ND aggregates in the solution, thereby crushing and dissociating the ND aggregates, and the silane coupling agent acts on ND particles dissociated from the ND aggregates to bond thereto.

This bond is a bond (covalent bond) produced via a dehydration condensation reaction between a silanol group, which is formed by hydrolysis of at least a part of the alkoxysilyl group of the silane coupling agent and a surface hydroxyl group of the ND particle. This covalent bond may occur between one silanol group of the silane coupling agent and one surface hydroxyl group of the ND particle, and may occur between two silanol groups of the silane coupling agent and two surface hydroxyl groups of the ND particle. That is, the covalent bond between the silane coupling agent and the ND particle may be one or two. Because the silane coupling agent has an alkoxysilyl group as a hydrolyzable group, a silanol group can be formed from an alkoxysilyl group even with slight moisture contained in the reaction system of the modification S4. The surface-modified ND according to an embodiment of the present invention may only need to include, at least in part of the surface-modified ND, the group represented by Formula (1) above and bonded to an ND particle by one covalent bond as a surface-modifying group.

The size of the zirconia beads used in the modification S4 is, for example, from 15 to 500 μm, and preferably from 15 to 300 μm. Examples of the solvent used in the modification S4 include methanol, ethanol, propanol, isopropanol, 2-propanol, tetrahydrofuran, acetone, methyl ethyl ketone, 1-methoxypropanol, and methyl isobutyl ketone. The ratio of the ND aggregates to the silane coupling agent in the solution (weight ratio) is, for example, from 2:1 to 1:10. The content ratio of the ND aggregates in the mixed solution of the modification S4 is, for example, from 0.5 to 5 wt. %, and the concentration of the silane coupling agent is, for example, from 5 to 40 wt. %. The duration of the reaction for the modification S4 is, for example, from 4 to 20 hours. As necessary, the surface-modified ND obtained in the modification S4 can be dried in the same manner as in the drying S3, thereby obtaining the surface-modified ND as a powder. In addition, if unreacted ND aggregates are present in the solution that has undergone the modification S4, the solution is allowed to stand, then the supernatant liquid is collected, and thereby a surface-modified ND having a reduced content of the unreacted ND aggregates can be obtained.

The modification S4 as described above can produce a surface-modified ND including ND particles and surface-modifying groups bonded to the ND particles. The surface-modified ND produced by the present method is dispersed in a dispersion medium, such as an organic solvent, thereby providing a surface-modified ND dispersion liquid. In addition, the surface-modified ND dispersion liquid may be subjected to a solvent replacement procedure to change the solvent used in the modification S4 to another solvent.

Surface-Modified Nanodiamond Dispersion Liquid

The surface-modified ND dispersion liquid according to an embodiment of the present invention includes the surface-modified ND and a dispersion medium, and the surface-modified ND is in a state of being dispersed in a dispersion medium, such as an organic solvent. The surface-modified ND of the surface-modified ND dispersion liquid is dispersed preferably as colloidal particles being separated from each other in the dispersion medium. The surface-modified ND dispersion liquid contains the surface-modified ND particularly excellent in dispersibility and thus can be suitably used as a feedstock for the surface-modified ND.

Examples of the organic solvent include methanol, ethanol, propanol, 2-propanol, isopropanol, tetrahydrofuran, acetone, methyl ethyl ketone, 1-methoxypropanol, methyl isobutyl ketone, toluene, xylene, cycloheptane, cyclohexane, cyclopentane, methylcyclohexane, ethylcyclohexane, decahydronaphthalene, hexane, heptane, paraffin, polyalphaolefins, polyol esters, polyalkylene glycols, and mineral oils. One type alone or two or more types of these organic solvents in combination can be used.

The content of the surface-modified ND (solid concentration) in the surface-modified ND dispersion liquid is, for example, from 0.001 to 10 wt. %. Thus, the content of the dispersion medium in the surface-modified ND dispersion liquid is, for example, from 90 to 99.999 wt. %, and the content of the organic solvent in the dispersion medium is, for example, 50 wt. % or greater (from 50 to 100 wt. %), preferably 80 wt. % or greater, and more preferably 90 wt. % or greater.

The average particle size (median size) of the surface-modified ND in the surface-modified ND dispersion liquid according to an embodiment of the present invention is, for example, 50 nm or less (from 3 to 50 nm), preferably from 40 nm or less, more preferably from 30 nm or less, and even more preferably from 20 nm or less. The average particle size of the surface-modified ND is preferably small in terms of providing high transparency when dispersed in a resin or the like. Here, the average particle size of the surface-modified ND in the surface-modified ND dispersion liquid can be measured by dynamic light scattering method.

The surface-modified ND dispersion liquid according to an embodiment of the present invention may include zirconium derived from zirconia beads used in the modification S4 of the manufacturing process of the surface-modified ND. The content (ratio) of the zirconium (in terms of Zr element) in the dispersion liquid is 0.01 wt. % or greater (for example, from 0.01 to 20 wt. %), preferably 0.1 wt. % or greater, more preferably 0.5 wt. % or greater, even more preferably 1 wt. % or greater, particularly preferably 2 wt. % or greater, and most preferably 3 wt. % or greater, based on the total content of the surface-modified ND and the zirconium (in terms of Zr element). Zirconium contained in a ratio within the range described above facilitates dispersion stabilization of the surface-modified ND when dispersed in the dispersion medium. It is thought that zirconium inhibits aggregation of ND particles. Here, the zirconium may be a compound, such as zirconium oxide.

In addition, the surface-modified ND dispersion liquid according to an embodiment of the present invention may contain an additional component, such as an additive, in addition to the surface-modified ND and the dispersion medium described above. The content of the additional component is, for example, 30 wt. % or less (from 0 to 30 wt. %), preferably 20 wt. % or less, more preferably 10 wt. % or less, even more preferably 5 wt. % or less, and particularly preferably 1 wt. % or less based on the total amount of the surface-modified ND dispersion liquid. Thus, the total content of the surface-modified ND and the dispersion medium described above is, for example, 70 wt. % or greater (from 70 to 100 wt. %), preferably 80 wt. % or greater, more preferably 90 wt. % or greater, even more preferably 95 wt. % or greater, and particularly preferably 99 wt. % or greater of the total amount of the surface-modified ND dispersion liquid.

Resin Dispersion

The resin dispersion according to an embodiment of the present invention includes a surface-modified ND and a resin. The resin dispersion is a dispersion in a state where the surface-modified ND or those derived from the surface-modified ND is dispersed in a resin. The resin dispersion can be prepared, for example, by mixing a resin and the surface-modified ND described above under heating at a temperature not lower than the glass transition temperature or melting point of the resin. The resin may be bonded to the surface-modified ND by reaction with an N-substituted or unsubstituted amino group of the surface-modifying group on the surface-modified ND. Note that those derived from the surface-modified ND described above means, for example, a reaction product of a surface-modified ND having an N-substituted or unsubstituted amino group and another compound.

Examples of the resin include thermosetting resins or thermoplastic resins, and among them, thermosetting resins are preferred. Examples of thermosetting resins include epoxy resins, acrylic resins, polyimide resins, phenol resins, and melamine resins, and among them, epoxy resins, acrylic resins, and polyimide resins are preferred. Examples of thermoplastic resins include nylon resins, polyethylene terephthalate (PET), polybutylene terephthalate (PBT), and polyimide (PI). One type alone or two or more types of these resins in combination can be used. Monomers (monomeric substances) of these resins may also be used.

The temperature for melt mixing the resin and the surface-modified ND may be not lower than the glass transition temperature or melting point of the resin, and is, for example, from 150 to 400° C. and preferably from 180 to 300° C.

The content of the surface-modified ND in the resin dispersion according to an embodiment of the present invention can be adjusted as appropriate for the application, and is, for example, approximately from 0.0001 to 10 wt. %, preferably from 0.001 to 5 wt. %, more preferably from 0.005 to 3 wt. %, and even more preferably from 0.01 to 1 wt. %.

The resin dispersion according to an embodiment of the present invention may include zirconium derived from zirconia beads used in the modification S4 of the manufacturing process of the surface-modified ND. The content (ratio) of the zirconium (in terms of Zr element) in the resin dispersion is 0.01 wt. % or greater (for example, from 0.01 to 20 wt. %), preferably 0.1 wt. % or greater, more preferably 0.5 wt. % or greater, even more preferably 1 wt. % or greater, particularly preferably 2 wt. % or greater, and most preferably 3 wt. % or greater, based on the total content of the surface-modified ND and the zirconium (in terms of Zr element). Zirconium contained in a ratio within the range described above facilitates dispersion stabilization of the surface-modified ND when dispersed in the resin. It is thought that zirconium inhibits aggregation of ND particles.

In addition to the resin and the surface-modified ND, the resin dispersion according to an embodiment of the present invention can contain various additives as necessary provided that they do not impair the effects of the present invention. Examples of the additive include flame retardants, stabilizers, ultraviolet absorbers, photostabilizers, antistatic agents, conductivity-imparting agents, lubricants, bulking agents, dispersants, release agents, blowing agents, colorants, various types of inorganic substances (such as silica and metal fine particles), and fillers (such as nanocarbon materials). The content of the additive (total amount when two or more types of additives are contained) is, for example, 30 wt. % or less, preferably 20 wt. % or less, more preferably 10 wt. % or less, and even more preferably 5 wt. % or less, based on that of the resin.

The resin dispersion according to an embodiment of the present invention can be suitably used in applications where high mechanical strength, high refractive index, high thermal conductivity, and heat resistance of the nanodiamond are required. Examples of the applications include functional hybrid materials, thermal functional materials (such as heat-resistant, heat-storage, thermoelectric conduction, and thermal insulation materials), photonic materials (such as EL, LED, liquid crystal, and optical disks), bio/biocompatible materials, catalysts, coating materials, paints, inks, plating materials, abrasive materials, films (for example, hard coat films for touch panels, various displays, etc., and heat shielding films), sheets, screens (for example, transmissive transparent screens), fillers (for example, fillers for improving heat dissipation and mechanical properties), thermal stabilizers, and heat-resistant plastic substrate materials (for flexible displays).

EXAMPLES

Hereinafter, the present invention will be described more specifically with reference to examples, however, the present invention is not limited by these examples. Each value in Examples and Comparative Examples were measured by the following methods.

Median Size

The median size (particle size D50) with respect to ND particles contained in a surface-modified ND aqueous dispersion liquid is a value measured by dynamic light scattering method (non-contact backscattering method) using a device available from Spectris Co., Ltd. (trade name "Zeta-Sizer Nano ZS"). The surface-modified ND aqueous dispersion liquid for the measurement is a liquid that is diluted with ultrapure water to an ND concentration of 0.2 to 2.0 wt. % and then undergoes ultrasonic irradiation with an ultrasonic cleaner.

ICP Emission Spectroscopy

The dry matter (powder), 100 mg, remaining after evaporation of the solvent by heating from the surface-modified ND dispersion liquid was placed in a magnetic crucible and subjected to dry decomposition in an electric furnace. This dry decomposition was performed in three stages: a condition at 450° C. for one hour, followed by a condition at 550° C. for 1 hour, and followed by a condition at 650° C. for 1 hour. After such dry decomposition, 0.5 mL of concentrated sulfuric acid was added to the residual substance in the magnetic crucible and evaporated to dryness. The resulting dry solid was finally dissolved in 20 mL of ultrapure water. An analytical sample was thus prepared. This analytical sample was analyzed with an ICP emission spectrometer (trade name "CIROS120", available from Rigaku Corporation). The analytical sample was prepared such that the lower detection limit of the analysis was 50 ppm by weight. In addition, in the present analysis, a mixed standard solution XSTC-22 available from SPEX Companies and an atomic absorption standard solution Zr1000 available from Kanto Chemical Co., Inc. were diluted and prepared as appropriate with an aqueous sulfuric acid solution having the same sulfuric acid concentration as that of the analytical sample and used as standard solutions for a calibration curve. Furthermore, in the present analysis, a measured value obtained by operation and analysis with an empty crucible in the same manner was subtracted from the measured value obtained from the ND dispersion liquid sample measured to determine the zirconia concentration (in terms of Zr element) in the sample.

Example 1

A surface-modified ND dispersion liquid or a surface-modified ND was produced via the following generation, purification, drying, and modification.
Formation
In the formation, first, a molded explosive fitted with an electric detonator was placed inside a pressure-resistant vessel for detonation, and the vessel was sealed in a state where gas of atmospheric composition at normal pressure and the explosive to be used coexisted inside the vessel. The vessel was made of iron, and the volume of the vessel was 15 m$^3$. A mixture, 0.50 kg, of trinitrotoluene (TNT) and cyclotrimethylenetrinitroamine, namely hexogen (RDX), was used as the explosive. The weight ratio of TNT to RDX (TNT/RDX) in the explosive is 50/50. The electric detonator was then triggered to detonate the explosive inside the vessel. The vessel was then allowed to stand at room temperature for 24 hours, thereby lowering the temperature of the vessel and the inside thereof. After the cooling, an ND crude product adhering to the inner wall of the vessel (including aggregates of ND particles and soot generated by the detonation method) was scraped with a spatula to collect the ND crude product. The amount of the ND crude product collected was 0.025 kg.

The ND crude product obtained by performing the formation as described above several times was then subjected to an acid treatment of the purification. Specifically, slurry obtained by adding 6 L of 10 wt. % hydrochloric acid to 200 g of the ND crude product was subjected to a heat treatment under reflux at normal pressure for 1 hour. The heating temperature for this acid treatment is from 85 to 100° C. Then, after cooling, solid (including ND aggregates and soot) was washed with water by decantation. The solid was repeatedly washed with water by decantation until the pH of the precipitation liquid reached 2 from the lower pH side.
Purification
An oxidation treatment of the purification was then performed. Specifically, first, 5 L of 60 wt. % aqueous sulfuric acid solution and 2 L of 60 wt. % aqueous chromic acid solution were added to a precipitation liquid after the decantation to obtain a slurry, and then the slurry was subjected to a heat treatment under reflux at normal pressure for 5 hours. The heating temperature for this oxidation treatment is from 120 to 140° C. Then, after cooling, solid (including ND aggregates) was washed with water by decantation. The supernatant liquid was colored when initially washed with water, and the solid was repeatedly washed with water by decantation until the supernatant liquid became visually transparent. Then, 1 L of 10 wt. % aqueous sodium hydroxide solution was added to the precipitation liquid obtained by the last decantation in the repeating process, and then the solution was subjected to a heat treatment under reflux at normal pressure for 1 hour. The heating temperature for this treatment is from 70 to 150° C. Then, after cooling, a precipitation liquid was obtained by decantation, and the pH was adjusted to 2.5 by adding 20 wt. % hydrochloric acid to the precipitation liquid. Thereafter, solid in the precipitation liquid was washed with water by centrifugal precipitation method.

Drying
The drying was then performed. Specifically, the liquid was evaporated from the ND aqueous dispersion liquid obtained from the purification using an evaporator, and then the resulting residual solid was dried by heating drying in a drying oven for 1 hour. The heating temperature for drying was set at 150° C.
Modification
The ND aggregates, 0.15 g, obtained from the drying was weighed into a reaction vessel, and 15 cc of ethanol and 1 g of 3-aminopropyltrimethoxysilane (available from Tokyo Chemical Industry Co., Ltd.) as a silane coupling agent were added and stirred for 10 minutes. After stirring, 10 cc of zirconia balls (trade name "YTZ", 30 µm in diameter, available from Tosoh Corporation) were added. After addition, the ND particles were reacted with the silane coupling agent by ultrasonication for 12 hours using an ultrasonic disperser (available from SMT Co., Ltd., model "UH-600S") in a state where the tip of the vibrator of the ultrasonic disperser was immersed in the solution in the reaction vessel under cooling the solution in ice water. The solution was initially gray, but the particle size was gradually reduced, and the particles were well dispersed, resulting in a uniform, black liquid at the end. It is thought that this is because ND particles are dissociated (crushed) one after another from the ND aggregates, the silane coupling agent acts on and bonds to the ND particles in a dissociated state, and surface-modified ND particles are dispersed and stabilized in an ethanol solvent. A surface-modified ND dispersion liquid was thus obtained. The median size (particle size D50) of the surface-modified ND particles of the resulting surface-modified ND dispersion liquid measured by the above method was 18 nm.

Furthermore, the resulting surface-modified ND dispersion liquid was allowed to stand for a whole day and night, the supernatant liquid was collected, and then 15 mL of the supernatant liquid was added dropwise into a mixed solvent of toluene (16 mL) and hexane (4 mL). The supernatant liquid added dropwise changed from black to gray. The resulting liquid was treated with a centrifugal separator at 20000 G for 10 minutes to collect precipitated surface-modified ND. After the collection, the surface-modified ND was dried at 60° C. in a hot air dryer for a whole day and night. Zr was found to be present in 7.3% when the surface-modified ND particles after drying were quantified for Zr by the ICP emission spectroscopy described above.

The precipitated surface-modified ND particles after centrifugation, collected as described above were, in a wet state without drying, redispersed to 2 wt. % solid content with ethanol. The appearance of the surface-modified ND dispersion liquid after the redispersion was black and the surface-modified ND particles were dispersed and stabilized in the ethanol solvent. In addition, the median size (particle size D50) of the surface-modified ND particles of this surface-modified ND dispersion liquid measured by the above method was 18 nm.

Example 2

An operation similar to that of Example 1 was performed except that [3-(N,N-dimethylamino)propyl]trimethoxysilane was used as the silane coupling agent in place of 3-aminopropyltrimethoxysilane used in the modification in Example 1, and the duration of the ultrasonification was 10 hours.

The median size (particle size D50) of the surface-modified ND particles measured by the above method after the 10-hour ultrasonication was 15 nm. In addition, Zr was found to be present in 5.2% when quantified by the ICP emission spectroscopy described above.

The appearance of the surface-modified ND dispersion liquid after the redispersion with ethanol was black and surface-modified ND was dispersed and stabilized in the ethanol solvent. In addition, the median size (particle size D50) of the surface-modified ND particles of this surface-modified ND dispersion liquid measured by the above method was 16 nm.

Example 3

An operation similar to that of Example 1 was performed except that trimethoxy[3-(phenylamino)propyl]trimethoxysilane was used as the silane coupling agent in place of 3-aminopropyltrimethoxysilane used in the modification in Example 1, and the solvent used in the modification was changed from ethanol to toluene.

The median size (particle size D50) of the surface-modified ND particles measured by the above method after the 12-hour ultrasonication was 20 nm. In addition, Zr was found to be present in 6.8% when quantified by the ICP emission spectroscopy described above.

The appearance of the surface-modified ND dispersion liquid after the redispersion with toluene was black, and surface-modified ND was dispersed and stabilized in the toluene solvent. In addition, the median size (particle size D50) of the surface-modified ND particles of this surface-modified ND dispersion liquid measured by the above method was 20 nm.

Comparative Example 1

An operation similar to that of Example 1 was performed except that zirconia beads were not added in the modification and the duration of the ultrasonification was 8 hours.

The appearance of the ND solution after the 8-hour ultrasonification remained grayish white as that when charged, and the ND particles were aggregated and sedimented. The ratio of Zr present was found to be less than 0.01% when the sedimented ND particles were quantified for Zr by the ICP emission spectroscopy described above. The ND particles, even with ultrasonication, were not dispersed in the nanometer order.

Comparative Example 2

An operation similar to that of Example 1 was performed except that zirconia beads were not added in the modification and the duration of the ultrasonification was 48 hours.

The appearance of the ND solution after the 48-hour ultrasonification remained grayish white as that when charged, and the ND particles were aggregated and sedimented. Sedimented ND particles were added in 2 wt. % in ethanol and ultrasonicated, but the appearance of the ND solution remained white-gray, and the ND particles precipitated (do not dispersed) when allowed to stand. The median size (particle size D50) of the surface-modified ND particles of this surface-modified ND dispersion liquid measured by the above method was 580 nm.

REFERENCE SIGNS LIST

1 Surface-modified nanodiamond
2 Nanodiamond particle
3 Surface-modifying group

To summarize the above, configurations according to an embodiment of the present invention and variations thereof will be described below.

(1) A surface-modified nanodiamond including a surface-modifying group on a surface of a nanodiamond particle, wherein the surface-modifying group includes a group represented by Formula (1).

(2) A surface-modified nanodiamond that is obtained by subjecting a nanodiamond particle and a silane coupling agent including a hydrocarbon group including an N-substituted or unsubstituted amino group to condensation reaction.

(3) The surface-modified nanodiamond according to (1) or (2), wherein the nanodiamond particle is a detonation nanodiamond particle.

(4) A surface-modified nanodiamond dispersion liquid including the surface-modified nanodiamond described in any one of (1) to (3) and a dispersion medium.

(5) The surface-modified nanodiamond dispersion liquid according to (4), wherein the dispersion medium is an organic solvent (for example, methanol, ethanol, propanol, 2-propanol, isopropanol, tetrahydrofuran, acetone, methyl ethyl ketone, 1-methoxypropanol, methyl isobutyl ketone, toluene, xylene, cycloheptane, cyclohexane, cyclopentane, methylcyclohexane, ethylcyclohexane, decahydronaphthalene, hexane, heptane, paraffin, polyalphaolefins, polyol esters, polyalkylene glycols, and mineral oils).

(6) The surface-modified nanodiamond dispersion liquid according to (4) or (5), wherein a content (solid concentration) of the surface-modified nanodiamond is from 0.001 to 10 wt. %.

(7) The surface-modified nanodiamond dispersion liquid according to any one of (4) to (6), wherein a median size (D50) of the surface-modified nanodiamond is 50 nm or less.

(8) The surface-modified nanodiamond dispersion liquid according to any one of (4) to (7), wherein the surface-modified nanodiamond dispersion liquid includes zirconium, and a ratio of the zirconium (in terms of Zr element) is 0.01 wt. % or greater based on a total content of the surface-modified nanodiamond and the zirconium (in terms of Zr element) contained in the surface-modified nanodiamond dispersion liquid.

(9) A resin dispersion including the surface-modified nanodiamond described in any one of (1) to (3) and a resin.

(10) The resin dispersion according to (9), wherein the resin is a thermosetting resin (for example, an epoxy resin, an acrylic resin, a polyimide resin, a phenol resin, and a melamine resin) or a thermoplastic resin (for example, a nylon resin, polyethylene terephthalate, polybutylene terephthalate, and polyimide).

(11) The resin dispersion according to (9) or (10), wherein a content of the surface-modified nanodiamond is from 0.0001 to 10 wt. %.

(12) The resin dispersion according to any one of (9) to (11), wherein the resin dispersion includes zirconium, and a ratio of the zirconium (in terms of Zr element) is 0.01 wt. % or greater based on a total content of the surface-modified nanodiamond and the zirconium (in terms of Zr element) contained in the resin dispersion.

INDUSTRIAL APPLICABILITY

The surface-modified nanodiamond according to an embodiment of the present invention has excellent reactivity with other compounds, such as acid, ester, epoxy, ketone, and halogen compounds, and excellent dispersibility in dispersion media, such as organic solvents, and resins, and thus is suitable as a feedstock for a surface-modified nanodiamond.

The invention claimed is:

1. A surface-modified nanodiamond comprising a surface-modifying group on a surface of a nanodiamond particle, wherein the surface-modifying group comprises a group represented by Formula (1):

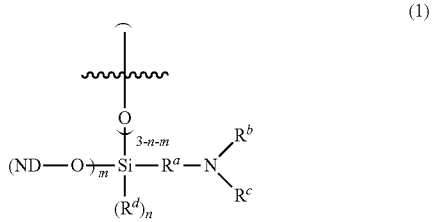

(1)

where $R^a$ represents an alkylene group having from 1 to 12 carbons, $R^b$ and $R^c$ each represent a hydrogen atom, an alkyl group having from 1 to 3 carbons, an aryl group, or an aralkyl group, and $R^d$ represents an identical or different alkyl group having from 1 to 3 carbons; a bond of an oxygen atom bonded to an atomic bond indicated by a wavy line in Formula (1) is identical or different and bonds to a hydrogen atom, an alkyl group having from 1 to 3 carbons, an acyl group, or a silicon atom in another group represented by Formula (1); n is 0, 1, or 2; m is 1, 2, or 3; and m+n≤3; and ND in Formula (1) represents the nanodiamond particle;

wherein at least one of $R^b$ and $R^c$ represents an alkyl group having 1 to 3 carbon atoms or a phenyl group.

2. The surface-modified nanodiamond according to claim 1, wherein the nanodiamond particle is a detonation nanodiamond particle.

3. A surface-modified nanodiamond dispersion liquid comprising the surface-modified nanodiamond described in claim 1 and a dispersion medium.

4. The surface-modified nanodiamond dispersion liquid according to claim 3, wherein a median size of the surface-modified nanodiamond is 50 nm or less.

5. The surface-modified nanodiamond dispersion liquid according to claim 4, wherein the surface-modified nanodiamond dispersion liquid comprises zirconium, and a ratio of the zirconium, in terms of Zr element, is 0.01 wt. % or greater based on a total content of the surface-modified nanodiamond and the zirconium, in terms of Zr element, contained in the surface-modified nanodiamond dispersion liquid.

6. A resin dispersion comprising the surface-modified nanodiamond described in claim 1 and a resin.

7. The resin dispersion according to claim 6, wherein the resin dispersion comprises zirconium, and a ratio of the zirconium, in terms of Zr element, is 0.01 wt. % or greater based on a total content of the surface-modified nanodiamond and the zirconium, in terms of Zr element, contained in the resin dispersion.

8. The surface-modified nanodiamond according to claim 1, obtained by subjecting a nanodiamond particle and a silane coupling agent comprising a hydrocarbon group comprising an N-substituted or unsubstituted amino group to condensation reaction.

9. The surface modified nanodiamond according to claim 1, wherein Ra in Formula (1) is a propylene group.

10. The surface-modified nanodiamond according to claim 1, wherein $R^b$ and $R^c$ in Formula (1) are each a hydrogen atom, an alkyl group having from 1 to 3 carbons, or a phenyl group.

11. The surface-modified nanodiamond according to claim 9, wherein $R^b$ and $R^c$ in Formula (1) are each a hydrogen atom, an alkyl group having from 1 to 3 carbons, or a phenyl group, wherein at least one of $R^b$ and $R^c$ represents an alkyl group having 1 to 3 carbon atoms or a phenyl group.

12. The surface-modified nanodiamond according to claim 1, wherein n in Formula (1) is 0.

13. The surface-modified nanodiamond according to claim 11, wherein n in Formula (1) is 0.

14. The surface-modified nanodiamond according to claim 13, wherein the nanodiamond particle is a detonation nanodiamond particle.

15. The surface-modified nanodiamond dispersion liquid according to claim 3, wherein a content of the surface-modified nanodiamond is from 0.001 to 10 wt. %.

16. A surface-modified nanodiamond dispersion liquid comprising the surface-modified nanodiamond described in claim 14 and a dispersion medium.

17. The surface-modified nanodiamond dispersion liquid according to claim 16, wherein the surface-modified nanodiamond dispersion liquid comprises zirconium, and a ratio of the zirconium, in terms of Zr element, is 0.01 wt. % or greater based on a total content of the surface-modified nanodiamond and the zirconium, in terms of Zr element, contained in the surface-modified nanodiamond dispersion liquid.

18. The surface-modified nanodiamond dispersion liquid according to claim 17, wherein a content of an additional component is 30 wt. % or less based on a total amount of the surface-modified ND dispersion liquid.

19. The surface-modified nanodiamond dispersion liquid according to claim 18, wherein a content of the surface-modified nanodiamond is from 0.001 to 10 wt. %.

20. The resin dispersion according to claim 6, wherein a content of the surface-modified nanodiamond is from 0.0001 to 10 wt. %.

21. The surface-modified nanodiamond according to claim 1, wherein the compound of Formula (1) is trimethoxy [3-(phenylamino)propyl]trimethoxysilane or [3-(N,N-dimethylamino)propyl]trimethoxysilane.

* * * * *